(12) United States Patent
Grasso et al.

(10) Patent No.: US 12,491,920 B2
(45) Date of Patent: Dec. 9, 2025

(54) CONTROL SYSTEM FOR A RAILWAY CONVOY, PARTICULARLY FOR THE TRANSPORT OF GOODS

(71) Applicant: FAIVELEY TRANSPORT ITALIA S.P.A., Turin (IT)

(72) Inventors: Angelo Grasso, Asti (IT); Roberto Tione, Turin (IT); Roberto Correndo, Turin (IT)

(73) Assignee: Faiveley Transport Italia S.p.A., Turin (IT)

( * ) Notice: Subject to any disclaimer, the term of this patent is extended or adjusted under 35 U.S.C. 154(b) by 407 days.

(21) Appl. No.: 17/995,680

(22) PCT Filed: Apr. 27, 2021

(86) PCT No.: PCT/IB2021/053441
§ 371 (c)(1),
(2) Date: Oct. 6, 2022

(87) PCT Pub. No.: WO2021/220144
PCT Pub. Date: Nov. 4, 2021

(65) Prior Publication Data
US 2023/0150556 A1 May 18, 2023

(30) Foreign Application Priority Data
Apr. 28, 2020 (IT) ........................ 102020000009205

(51) Int. Cl.
*B61H 13/20* (2006.01)
*B61H 13/06* (2006.01)
*B61H 13/34* (2006.01)

(52) U.S. Cl.
CPC ............. *B61H 13/20* (2013.01); *B61H 13/06* (2013.01); *B61H 13/34* (2013.01)

(58) Field of Classification Search
CPC ........ B60T 11/32; B60T 13/66; B60T 13/665; B60T 17/228; B61H 13/06; B61H 13/20; B61H 13/34
(Continued)

(56) References Cited

U.S. PATENT DOCUMENTS 6,824,226 B2  11/2004  Smith, Jr. et al.
9,340,195 B2   5/2016  Smith
(Continued)

FOREIGN PATENT DOCUMENTS

WO   2017025895 A1   2/2017

OTHER PUBLICATIONS

ISA European Patent Office, International Search Report Issued in Application No. PCT/IB2021/053441, Aug. 19, 2021, WIPO, 2 pages.

*Primary Examiner* — Robert A. Siconolfi
*Assistant Examiner* — San M Aung
(74) *Attorney, Agent, or Firm* — K&L Gates LLP (57) ABSTRACT

A control system is described for a railway convoy, particularly for the transport of goods, comprising wagons, a master locomotive and at least one slave locomotive. The railway convoy comprises a brake pipe which extends along the entire railway convoy. The master locomotive is arranged to control the pressure in the brake pipe and to send traction and/or braking commands to the slave locomotive by means of a communication channel. The at least one slave locomotive comprises a transceiver means arranged to receive the traction and/or braking commands and to re-transmit them to a traction control unit and to a brake control unit of the slave locomotive. The control system includes a safety unit arranged to prevent a relay valve from supplying the pneumatic brake pipe when at least one malfunction condition of the control system for a railway convoy occurs.

13 Claims, 6 Drawing Sheets

(58) Field of Classification Search
USPC ............................................................ 188/33
See application file for complete search history.

(56) References Cited

U.S. PATENT DOCUMENTS

| | | | |
|---|---|---|---|
| 2002/0153766 A1* | 10/2002 | Kettle, Jr. ............. | B60T 13/665 |
| | | | 303/7 |
| 2007/0241610 A1* | 10/2007 | Smith .................... | B60T 17/228 |
| | | | 303/22.6 |
| 2017/0096128 A1* | 4/2017 | Correndo ............. | B60T 17/228 |
| 2019/0111904 A1* | 4/2019 | Lichterfeld ........... | B60T 13/365 |
| 2019/0217838 A1* | 7/2019 | Grasso .................. | B60T 13/665 |

* cited by examiner

CONTROL SYSTEM FOR A RAILWAY CONVOY, PARTICULARLY FOR THE TRANSPORT OF GOODS

CROSS REFERENCE TO RELATED APPLICATIONS

The present application is a U.S. National Phase of International Application No. PCT/IB2021/053441 entitled "CONTROL SYSTEM FOR A RAILWAY CONVOY, PARTICULARLY FOR THE TRANSPORT OF GOODS," and filed on Apr. 27, 2021. International Application No. PCT/IB2021/053441 claims priority to Italian Patent Application No. 102020000009205 filed on Apr. 28, 2020. The entire contents of each of the above-listed applications are hereby incorporated by reference for all purposes.

TECHNICAL FIELD

This invention generally lies within the field of railway braking systems; in particular, the invention relates to a control system for a railway convoy, particularly for the transport of goods.

PRIOR ART

In the following, reference will be made to the European standards EN50129:rev.2018, EN50159:rev.2010, EN50126-1:rev.2017, EN50126-2:rev.2017, and EN50128:rev.2011, which are:
- EN50126 ["Railway applications. The specification and demonstration of reliability, availability, maintainability and safety (RAMS)];
- EN50128 [" Railway applications. Communications, signaling and processing systems. Software for railway control and protection systems "];
- EN50129 [" Railway applications. Communication, signaling and processing systems. Safety related electronic systems for signalling "].
- EN50159 [" Railway applications. Communication, signaling and processing systems. Safety-related communication in transmission systems" ].

In particular, standard EN50126 defines the methodologies for assigning the safety levels SIL0/1/2/3/4 (with safety level SIL4 indicating the maximum safety level) to the subsystems making up the system in question, based on the results of the safety analysis, and standards EN50128 and EN50129 define the design criteria to be applied to the software and hardware components respectively on the basis of the SIL levels assigned based on said safety analysis results.

It is known in the prior art that:
- the safety calculations relating to the emergency braking function carried out according to European standard EN50126 systematically assign a safety integrity level SIL≥3 to said emergency braking function, and consequently normally to the subsystems that implement them;
- the safety calculations relating to the service braking function carried out in accordance with European standard EN50126 normally assign a safety integrity level SIL≤2 to said service braking function, and consequently normally to the subsystems that implement them;
- the development of a control unit, typically microprocessor-based or FPGA-based, according to SIL≥3 levels in accordance with EN50128 and EN50129, involves design, validation and certification costs that are approximately an order of magnitude higher than design according to SIL≤2 levels.

In relation to the last of the preceding points, it is clear that it is worthwhile keeping the functions to be developed according to the SIL≥3 safety levels extremely limited and simple.

Figure 1:
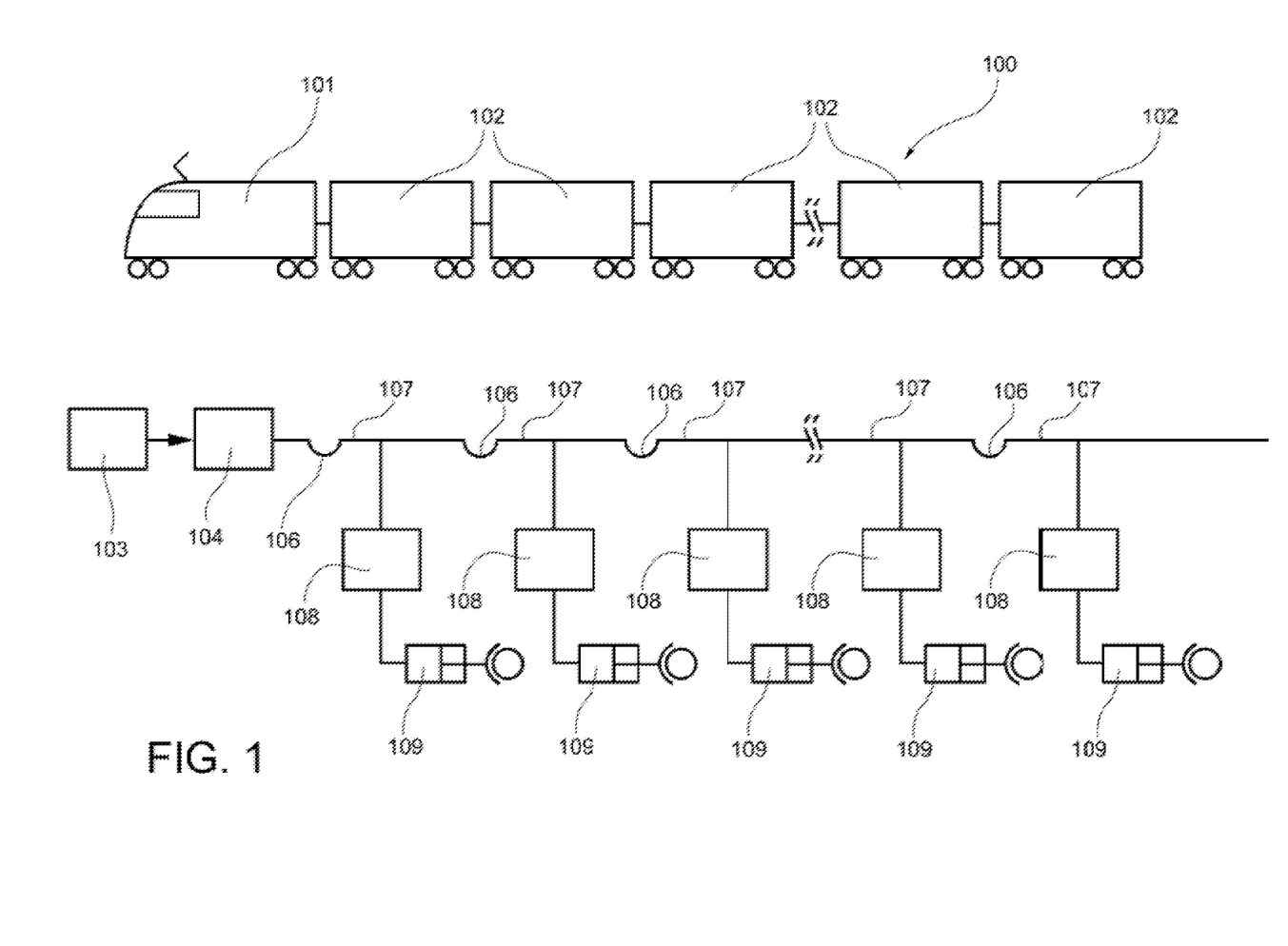
FIG. 1 shows a known configuration of a train for transporting goods.

FIG. 1 illustrates a known configuration of a train for transporting goods.

A train 100 is formed by a locomotive 101 pulling a plurality of wagons 102.

The braking system of the train 100 installed on the locomotive 101 consists of a unit 103 for producing, filtering and storing compressed air, which unit is arranged to supply the braking control unit 104, said compressed air being stored at pressure values that normally vary between 6 bar and 10 bar.

The braking control unit 104 supplies a pipe 105 known as the "brake pipe." Said pipe passes along the entire length of the train, and normally consists of rigid segments 107 installed on the wagons 102 and flexible elements 106 installed between the wagons. The flexible elements 16 are adapted to ensure the pneumatic continuity of the brake pipe 105 in all conditions where the railway route is curved.

On each wagon 102, a braking unit 108 is connected to the brake pipe 105, from which it collects compressed air to supply the brake cylinders 109 at a pressure that depends on the current pressure value imposed by the braking control unit 104 in the brake pipe 105.

Figure 3:
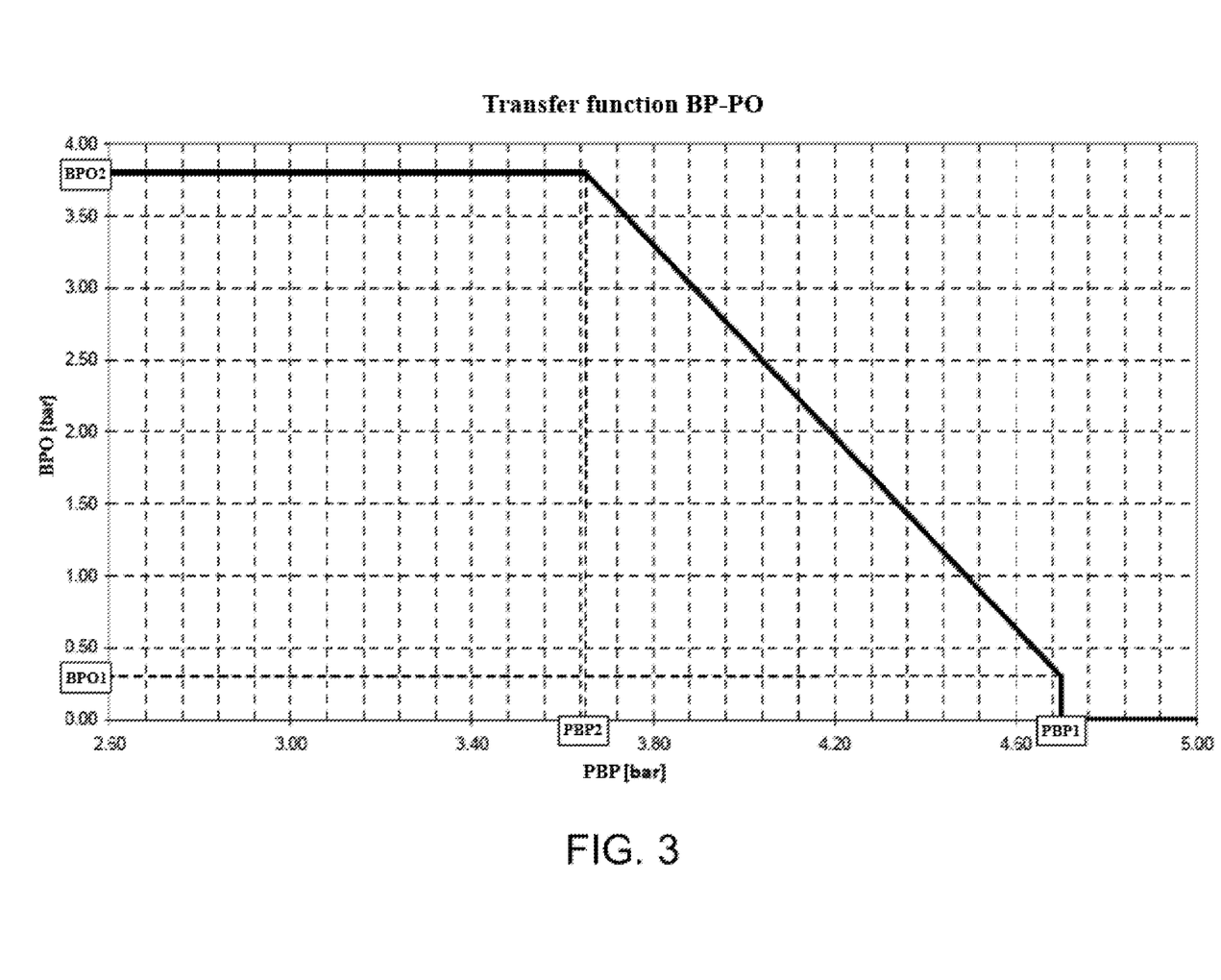
FIG. 3 shows a transfer function of a braking unit as specified by the UIC standards.

FIG. 3 illustrates the transfer function of the braking unit 108 as specified by the UIC (International Union of Railways) standards: the x-axis represents the pressure in the brake pipe 105, and the y-axis represents the braking pressure output from the braking unit 108.

When the pressure in the brake pipe, i.e. the input pressure to the braking unit 108, has a nominal value equal to 5 bar, the braking pressure output from the braking unit 108 assumes the value of 0 bar, i.e. no braking action is carried out.

When the pressure in the brake pipe, i.e. the input pressure to the braking unit 108, has any other value equal to or less than nominal 3.5 bar, the braking pressure output from the braking unit 108 assumes the value of 3.8 bar, i.e. the maximum braking pressure is applied, which corresponds to emergency braking.

For pressure values in the brake pipe, i.e. the input pressure to the braking unit 108, of between nominal 3.5 bar and nominal 5 bar, the braking pressure output from the braking unit 108 assumes linear pressure values of between nominal 3.8 bar and nominal 0 bar, except for a minimum pressure interval on the x-axis of approximately the nominal value of 5 bar.

Figure 2:
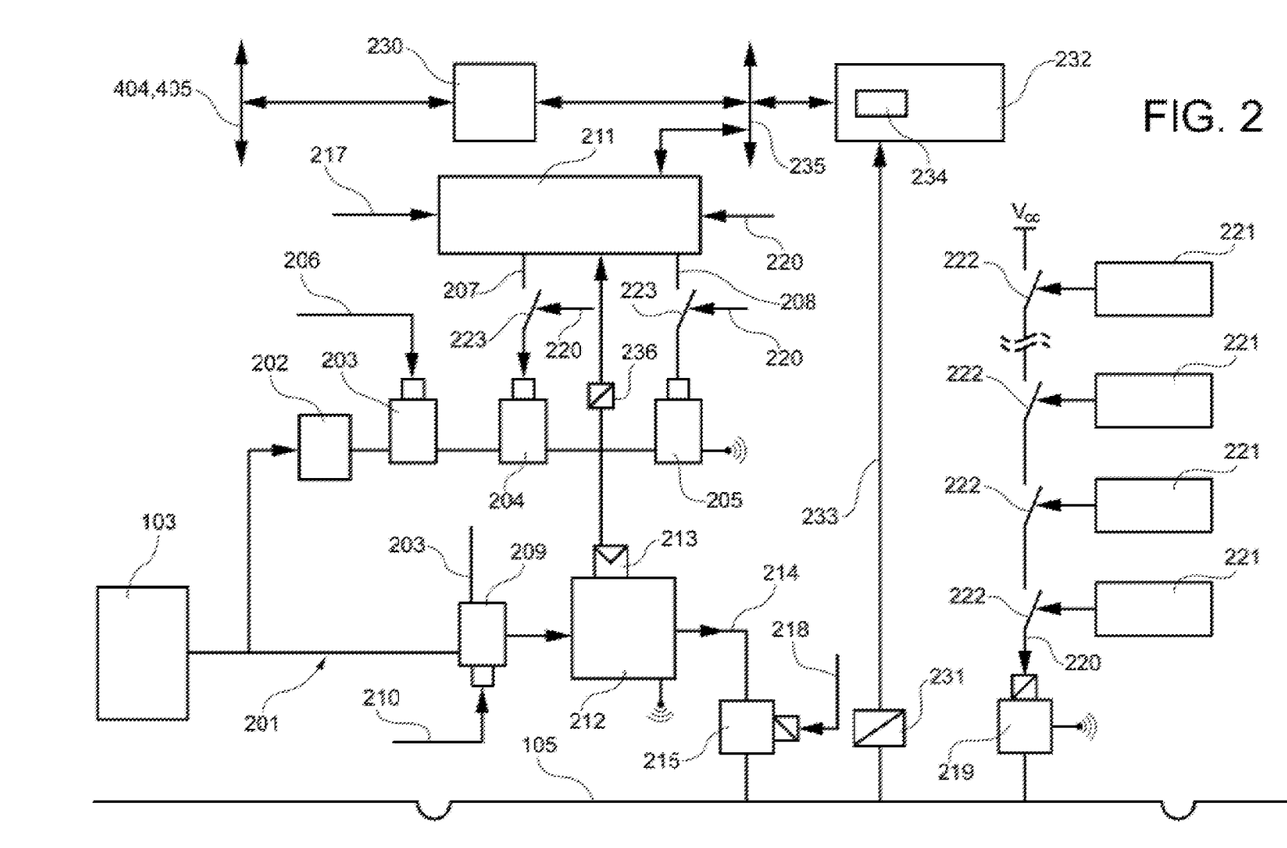
FIG. 2 shows a simplified embodiment of a braking control unit according to the prior art.

FIG. 2 illustrates a simplified embodiment of the braking control unit 104. In the prior art, the braking control unit 104 may assume a variety of more or less complex forms, for example as shown in FIG. 2.

A main pipe 201 is supplied by a unit 103 for producing, filtering and storing compressed air, said compressed air assuming pressure values that normally vary between 6 bar and 10 bar.

Said main pipe 201 supplies a pressure relief valve 202 which is intended to supply a group of pneumatic solenoid valves 203, 204, 205 with pressure values normally lower than 6 bar.

Said pneumatic solenoid valve 203 is actuated by an electrical command signal 206, and assumes a first state in which it inhibits the propagation of the supply pressure to the valve 204 when the electrical command signal 206 does not provide electrical power, and may assume a second state in which it allows the propagation of the supply pressure to the pneumatic solenoid valve 204 when the electrical command signal 206 provides electrical power.

The electrical command signal 206 may be generated by the brake control unit 211 or by an external source, the nature of which depends on the general architecture of the locomotive 101.

Said main pipe 201 also supplies a pneumatic solenoid valve 209.

Said pneumatic solenoid valve 209 is actuated by an electrical command signal 210, and assumes a first state in which it inhibits the propagation of the supply pressure to the relay valve 212 when the electrical command signal 210 does not provide electrical power, and may assume a second state in which it allows the propagation of the supply pressure to the relay valve 212 when the electrical command signal 210 provides electrical power.

The electrical command signal 210 may be generated by the brake control unit 211 or by an external source, the nature of which depends on the general architecture of the locomotive 101.

The pneumatic solenoid valve 204 is actuated by an electrical command signal 207 and may assume a first state in which it inhibits the propagation of the supply pressure to the pilot chamber 213 of the relay valve 212 when the electrical command signal 207 does not provide electrical power, and may assume a second state in which it allows the propagation of the supply pressure to the pilot chamber 213 of the relay valve 212 when the electrical command signal 207 provides electrical power.

The pneumatic solenoid valve 205 is actuated by an electrical command signal 208 and may assume a first state in which it allows the pressure in the pilot chamber 213 of the relay valve 212 to be discharged to the atmosphere when the electrical command signal 208 does not provide electrical power, and may assume a second state in which it inhibits the discharge of the pressure in the pilot chamber 213 of the relay valve 212 to the atmosphere when the electrical command signal 208 provides electrical power.

The electrical command signals 207 and 208 are generated by the brake control unit 211.

The brake control unit 211 receives a request command 217 to apply a pressure value to the brake pipe 105, in a nominal range between 0 bar and a maximum value normally between 5 bar and 5.5 bar.

The brake control unit 211 reduces, maintains and increases the pressure at the outlet 214 of the relay valve 212 in accordance with the request received from the command 217 by modulating the electrical signals 207, 208, powering both the pneumatic solenoid valves 204, 205 in order to increase the pressure at the outlet 214 of the relay valve 212, de-powering both the pneumatic solenoid valves 204, 205 in order to reduce the pressure at the outlet 214 of the relay valve 212, de-powering the pneumatic solenoid valve 204 and powering the pneumatic solenoid valve 205 to keep the pressure at the outlet 214 of the relay valve 212 constant, and closing the loop for controlling the pressure in the pilot chamber 213 by reading a first pressure sensor means 236 pneumatically connected to said pilot chamber 213.

A pneumatic solenoid valve 215 is positioned between the outlet 214 of the relay valve 212 and the brake pipe 105. Said pneumatic solenoid valve 215 is actuated by an electrical command signal 218, and assumes a first state in which it inhibits the pneumatic connection between the brake pipe 105 and the relay valve 212 when said electrical command signal 218 does not provide electrical power, and assumes a second state in which it allows the pneumatic connection between the brake pipe 105 and the relay valve 212 when said electrical command signal 218 provides electrical power.

In many real applications, depending on the local regulations of different railway operators, only the pneumatic solenoid valve 209 or only the pneumatic solenoid valve 215 are present in the diagram shown in FIG. 2.

A pneumatic solenoid valve 219 is pneumatically connected to the brake pipe 105. Said pneumatic solenoid valve 219 is actuated by an electrical signal 220 that is also defined as an "emergency loop," and assumes a first state in which it inhibits the pneumatic connection between the brake pipe 105 and the atmosphere when said emergency loop 220 provides electrical power, and assumes a second state in which it allows the pneumatic connection between the brake pipe 105 and the atmosphere when said emergency loop 220 does not provide electrical power.

The emergency loop 220 may be interrupted by one or more contacts 222 which are actuated by one or more devices 221 which may request emergency braking of the train.

In the presence of events that require emergency braking, said one or more devices 221 open the one or more respective contacts 222, thereby interrupting the emergency loop 220 and thus bringing the pneumatic solenoid valve 219 into its second state.

In this way, the pneumatic solenoid valve 219 pneumatically connects the brake pipe 105 to the atmosphere, i.e. brings the pressure in the brake pipe 105 to the value of nominal 0 bar, which corresponds to the pressure value of emergency braking.

In some non-exclusive cases, one or more devices 221 may coincide with a transceiver means 230 and/or with the brake control unit 211.

Furthermore, the emergency loop 220 may be connected to the brake control unit 211 which, in the event of a signal 220 indicating a request for emergency braking request, i.e. a non-powered signal, de-energizes the two pneumatic solenoid valves 204, 205 to bring the pressure at the outlet 214 of the relay valve 212 to 0 bar, i.e. it further discharges the brake pipe through the relay valve.

Still further, the emergency loop 220 may be used to activate the contacts 223 in the presence of power, or to disactivate the contacts in the absence of power. In this way, in the absence of power to the signal 220, the contacts 223 are positioned in the open condition, thereby de-energizing the two pneumatic solenoid valves 204, 205 in order to bring the pressure at the outlet 214 of the relay valve 212 to 0 bar, i.e. to further discharge the brake pipe through the relay valve, in redundancy to the action performed simultaneously by the pneumatic solenoid valve 219.

The action of bringing the pressure of the brake pipe 105 to the nominal value of 0 bar consequently implies applying the maximum braking pressure corresponding to 3.8 bar to the braking unit 108.

As previously stated, the emergency braking function is required to be developed according to safety level SIL4.

In the prior art, the group of components including the pneumatic solenoid valve 219, the signal 220, the one or more devices 221, the one or more respective contacts 222, the contacts 223 and above all their integration constituting the emergency braking application function are developed according to the SIL4 safety level in accordance with the applicable European standards.

The braking application action performed by the integration of the group of components including the pneumatic solenoid valve 219, the signal 220, the one or more devices 221, the one or more respective contacts 222 and the contacts 223 prevails over any action performed by said brake control unit 211: this solution allows for the development of the brake control unit 211 not to exceed the safety level SIL2 according to the standards EN50128 and EN50129.

A pressure switch 231 is pneumatically connected to the brake pipe 105 and is arranged to generate an electrical command signal 233 connected to the traction control unit 232.

When the pressure in the brake pipe 105 is greater than 3.5 bar, the pressure switch 231 provides power to the command signal 233. When the pressure in the brake pipe 105 is equal to or less than 3.5 bar, the pressure switch 231 stops power to the command signal 233.

An appropriate circuit 234 internal to the traction control unit 232 monitors the presence of power to the command signal 233: said circuit 234 allows the traction control unit 232 to power the traction motors (not shown) when tension is detected on the command signal 233 and said circuit 234 prevents the traction control unit 232 from powering the traction motors (not shown) when no tension is detected on the command signal 233.

This solution prevents the traction control system from powering the motors, i.e. from pulling the train 100, in the presence of an emergency braking request.

In the prior art, the group of components including the pressure switch 231, the command signal 233, the appropriate circuit 234 and above all their integration constituting the traction inhibition function in the presence of emergency braking are developed according to the SIL4 safety level in accordance with the applicable European standards.

Growing needs to increase the capacity of rail traffic for the transport of goods requires more traction power. If a single locomotive 101 is unable to provide the necessary power, one or more locomotives are added to the train 100.

Figure 4:
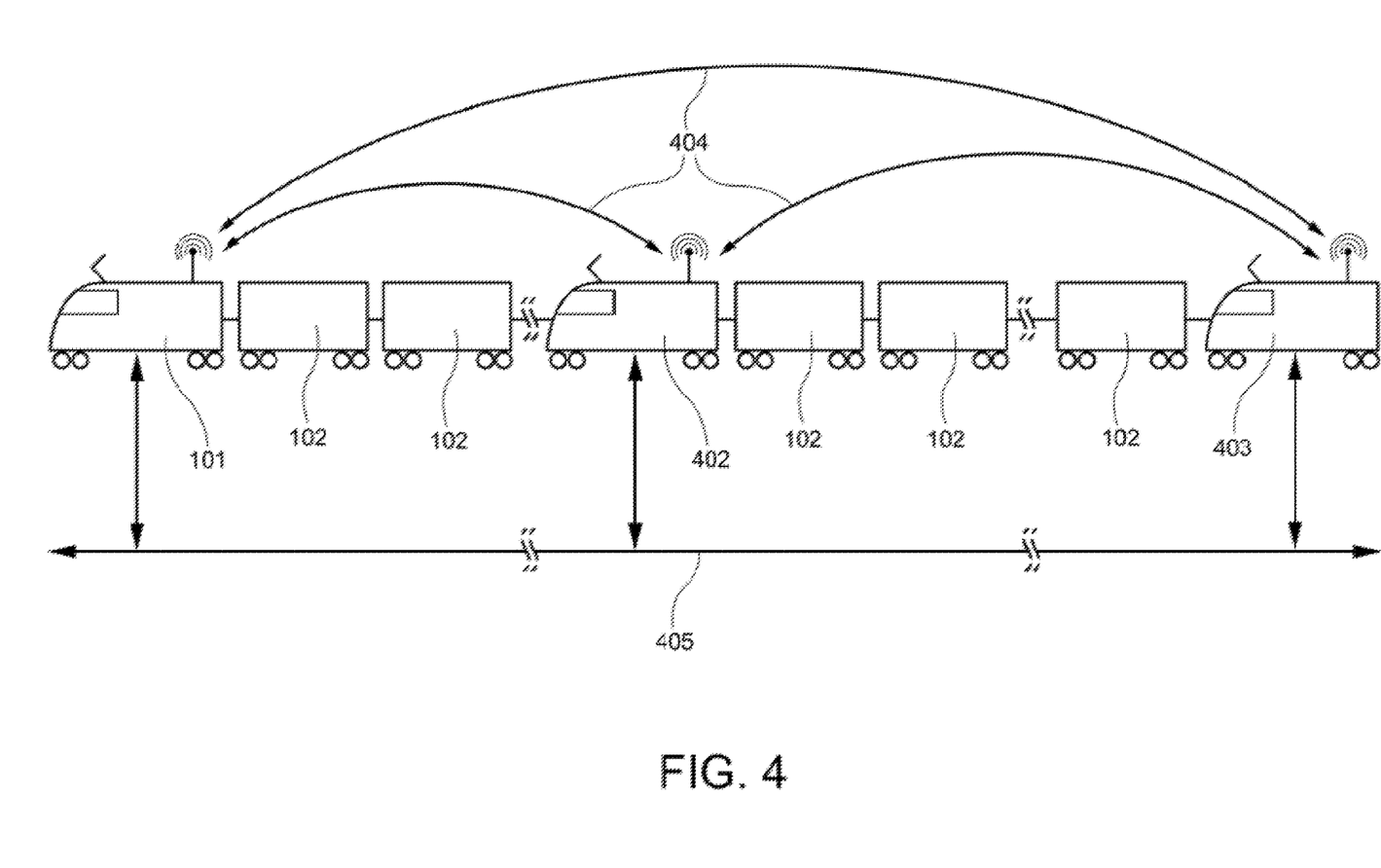
FIG. 4 shows a train in which a second locomotive is added in an intermediate position in said train.

In FIG. 4, by way of non-exclusive example, a second locomotive 402 is added in an intermediate position in the train 400. An additional locomotive 403 may be added at the end of the train 400 as an alternative to the locomotive 402 or in addition to the locomotive 402. Further locomotives may be added to the train 400. The further locomotives 402, 403 are also provided with their own unit 103 for producing, filtering and storing compressed air, which unit is arranged to supply its own brake control unit 104 and is connected to the brake pipe 105.

The further locomotives 402, 403, defined as slave locomotives, must be synchronized with the head locomotive 101, defined as the master locomotive, in order to be able to correctly replicate the traction or braking actions performed by the master locomotive 101. For this purpose, the master locomotive 101 and the one or more slave locomotives 402, 403 communicate with one another by means of a radio communication channel 404 or a wired serial communication channel 405. Internal to the master and slave locomotives, a transceiver means 230 is arranged to transmit and receive on the communication channel 404, 405. Internal to the master and slave locomotives, said transceiver means 230 communicates with the traction control unit 232 and with the brake control unit 211, by means of an internal communication means 235 that includes, not exclusively, a serial communication channel.

WO2017025895 describes in detail a communication system between a master locomotive and one or more slave locomotives, and the impact on the operational safety of a train as shown in FIG. 4 if the radio channel is lost, and claims a method for mitigating the risks in said degraded mode.

A non-exclusive case of said degraded mode is represented by the event in which the master locomotive 101 applies emergency braking, simultaneously sends the request to apply the emergency braking to one or more slave locomotives 402, 403, and at the same time one or more slave locomotives 402, 403, currently in a condition in which the brake is not applied, do not receive the request to apply emergency braking, in which case the following sequence of situations occurs:

near the master locomotive 101, the pressure in the brake pipe 105 drops to 0 bar near the one or more slave locomotives 402, 403, the pressure in the brake pipe 105 remains at 5 bar;

the pressure difference causes a flow of air from one or more slave locomotives 402, 403 toward the master locomotive 101, with a consequent pressure drop along the brake pipe 105, thereby producing pressure values ranging from nominal 5 bar near the first slave locomotive 402 to nominal 0 bar near the master locomotive 101;

all of the wagons where the pressure in the brake pipe is less than nominal 3.5 bar will regularly apply the maximum braking pressure value;

all of the wagons where the pressure in the brake pipe is between 3.5 bar and 5 bar will apply a pressure in accordance with the diagram shown in FIG. 3;

in particular, the wagons near the first slave locomotive 402 and between the second slave locomotive 402 and the possible further slave locomotives 403 will have a pressure in the brake pipe 105 that is greater than or equal to nominal 5 bar, not applying any braking;

furthermore, if the one or more slave locomotives 402, 403 were in an active traction condition prior to the loss of the communication channel 404, they will continue to apply traction since the pressure at the pressure switch 231 will not decrease below the value of 3.5 bar, thereby preventing the pressure switch 231 from inhibiting the traction control unit 232.

The overall result is represented by a train 100 in an emergency braking situation where only the front portion of the train is actually able to apply the emergency braking, while the portion of the train near the one or more slave locomotives 402, 403 remains in the release condition and the one or more slave locomotives 402, 403 continue to push the train, creating a high risk condition of the train 400 derailing.

WO2017025895 claims to prevent the relay valve 212 belonging to the one or more slave locomotives 402, 403 from supplying the pipe 405 if a communication channel 404 is lost. In this way, with due time, the pressure would be allowed to drop to 0 bar along the entire train, thereby preventing the risky situation described above.

WO2017025895 neither describes nor claims to which safety levels the devices and related software responsible for risk mitigation actions must be subjected.

It is clear from what has been previously described that the devices and related software responsible for risk mitigation actions, especially related to emergency braking, must be developed according to a SIL≥3 level according to standards EN50128 and EN50129.

In this case, the brake control unit 211, which is responsible for controlling the relay valve 212 and the pneumatic solenoid valves 209, 215, must be developed according to a SIL≥3 level according to the standards EN50128 and EN50129.

Given the functional complexity, hardware and software of said brake control unit 211, its development according to a SIL≥3 level according to the standards EN50128 and EN50129 is extremely complex and uneconomical for the reasons set out above.

SUMMARY OF THE INVENTION

The object of this invention is therefore that of providing a solution which may be simpler and less expensive to develop.

A further object is that of providing a solution in which, in an emergency braking situation, it is not only a front portion of the train that applies the emergency braking, so as to consequently reduce the risk of the train itself derailing.

The aforesaid and other objects and advantages are achieved, according to an aspect of the invention, by a control system for a railway convoy, particularly for the transport of goods, that has the features defined in claim 1. Preferred embodiments of the invention are defined in the dependent claims, the content of which is to be understood as an integral part of this description.

BRIEF DESCRIPTION OF THE DRAWINGS

The functional and structural features of some preferred embodiments of a control system for a railway convoy according to the invention will now be described. Reference is made to the appended drawings, in which.

DETAILED DESCRIPTION

Before explaining in detail a plurality of embodiments of the invention, it should be clarified that the invention is not limited in its application to the design details and configuration of the components presented in the following description or illustrated in the drawings. The invention is capable of assuming other embodiments and of being implemented or constructed in practice in different ways. It should also be understood that the phraseology and terminology have a descriptive purpose and should not be construed as limiting. The use of "include" and "comprise" and their variations is to be understood as encompassing the elements set out below and their equivalents, as well as additional elements and the equivalents thereof.

Figure 5:
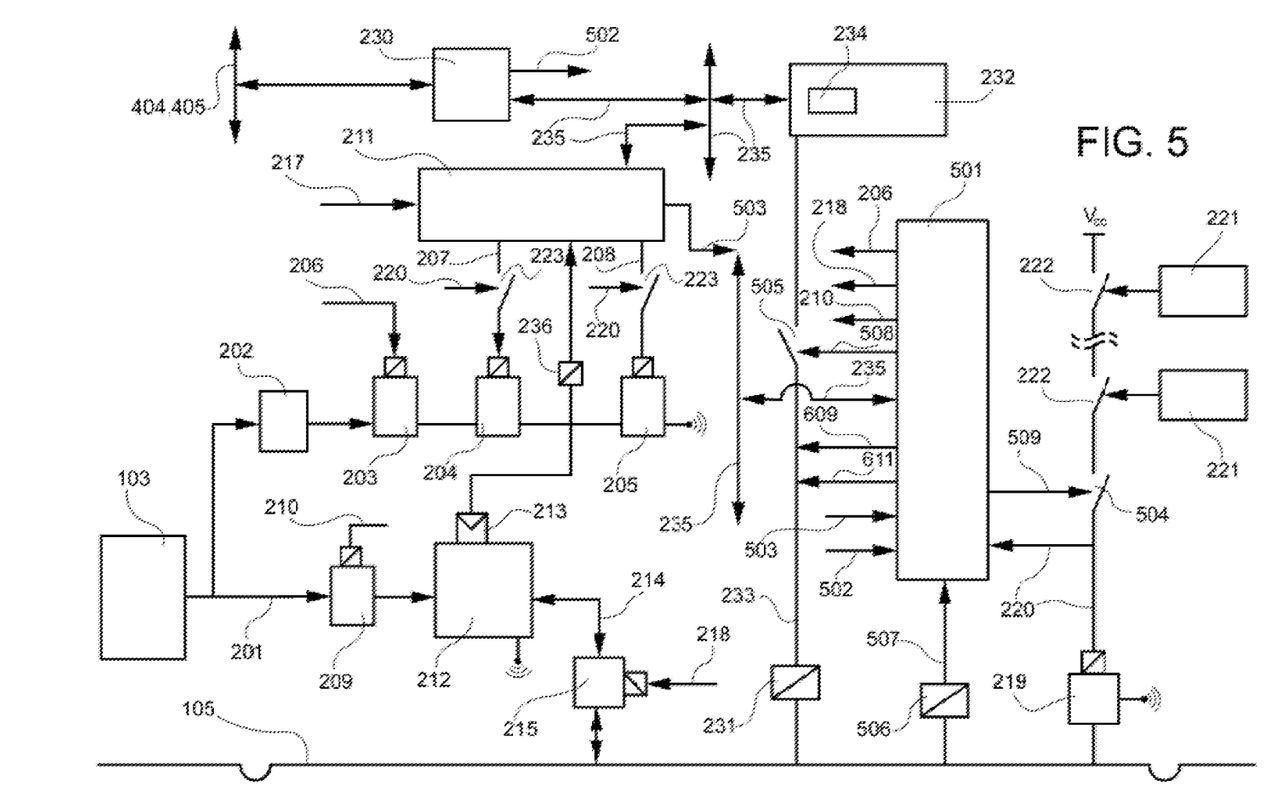
FIG. 5 is an exemplary embodiment of the control system for a railway convoy according to this invention.

FIG. 5 replicates the braking control system 104 that has been shown in FIG. 2 and previously described, with a new safety unit 501 added for the slave locomotives 402, 403 in order to monitor and reinforce the safety functions.

The following describes a first embodiment of a control system for a railway convoy 400, particularly for the transport of goods, comprising a plurality of wagons 102, a master locomotive 101 placed at the head of the train 400 and at least one slave locomotive 402, 403 distributed in the railway convoy 400.

The railway convoy 400 comprises a brake pipe 105 for the service and emergency pneumatic braking of the railway convoy 400. The brake pipe 105 extends along the entire railway convoy 400.

The master locomotive 101 is arranged to control the pressure in the brake pipe 105 and to send traction and/or braking commands to the at least one slave locomotive 402, 403 via a radio technology or wired technology communication channel 404, 405.

The at least one slave locomotive 402, 403 comprises a transceiver means 230 arranged to receive the traction and/or braking commands sent by the master locomotive 101 through the communication channel 404, 405. The transceiver means 230 is also arranged to re-transmit the traction and/or braking commends to a traction control unit 232 and to a brake control unit 211 of the at least one slave locomotive 402, 403 in order to control the pressure in the brake pipe 105.

The transceiver means may be a transceiver device or transceiver system or transceiver unit or the like.

The traction and/or braking commands are re-transmitted by means of a communication means 235 internal to the at least one slave locomotive 402, 403.

The brake control unit 211 is arranged to control the pressure in the brake pipe 105 by acting on a first pneumatic solenoid valve 204 arranged to increase the pressure in a pilot chamber 213 of a relay valve 212 and on a second pneumatic solenoid valve 205 arranged to reduce the pressure in the pilot chamber 213 of said relay valve 212.

An inlet of the relay valve 212 is arranged to be supplied by a main pipe 201 and an outlet of the relay valve 212 is arranged to be connected to the brake pipe 105.

The control system for a railway convoy 400 includes a safety unit 501 associated with the brake control unit 211.

This safety unit 501 is arranged to prevent the relay valve 212 from supplying the pneumatic brake pipe 105 when at least one malfunction condition of the control system for a railway convoy 400 occurs.

The at least one malfunction condition of the control system for a railway convoy 400 may comprise:
- a condition in which the communication channel no longer allows the traction and/or braking commands to be sent to the at least one slave locomotive 402, 403, or
- a condition in which the transceiver means 230 is no longer able to receive the traction and/or braking commands sent by the master locomotive 101 through said communication channel or to re-transmit the traction and/or braking commands to a traction control unit 232 and to a brake control unit 211 of the at least one slave locomotive 402, 403 in order to control the pressure in the brake pipe 105, or
- a condition in which the communication means 235 internal to said at least one slave locomotive 402, 403 does not allow said traction and/or braking commands to be re-transmitted to the traction control unit 232 and to the brake control unit 211 of said at least one slave locomotive 402, 403.

The aforesaid conditions may clearly also occur simultaneously in any combination thereof.

The brake control unit 211 may be developed according to the safety level SIL≤2 according to the standards EN50128 and EN50129 as described above. According to the invention, a safety unit 501 may therefore be added that is developed according to a SIL≤2 level according to standards EN50128 and EN50129.

In a first embodiment, the safety unit 501 may be arranged to receive a diagnostic signal 502 generated by the transceiver means 230. The diagnostic signal 502 may be arranged to have a first state in which it indicates that the transceiver means 230 is functioning correctly and that the communication with the one or more further locomotives belonging to the railway convoy 400 is considered to be established and functioning by the transceiver means 230. The diagnostic signal 502 may be arranged to have a second state which indicates that the transceiver means 230 is not functioning correctly and that the communication with the one or more further locomotives belonging to the railway convoy 400 is not considered to be established and functioning by the transceiver means 230.

The master locomotive 101 may send messages at a period T. In accordance with the recommendations of the standard EN50159, the messages sent by the master locomotive 101 contain a parameter that is indicative of the message being continuously updated by the master locomotive 101, by way of non-exclusive example a counter which is increased by the master locomotive with each message.

The messages sent by the master locomotive 101 are received by the transceiver means 230 and immediately propagated therefrom to the brake control unit 211 and to the safety unit 501 through the communication means 235.

To summarize the above, in the presence of at least one of the following cases:
  the safety unit 501 does not receive messages between a nominal time interval T corresponding to the transmission period of the master locomotive 101, with a predefined tolerance ±ΔT necessary for tolerating the physiological communication jitter,
  the safety unit 501 detects that the parameter indicative of the message being continuously updated does not indicate the currently received message being updated,
  the diagnostic signal 502 assumes the second state indicating that the transceiver means 230 is not functioning correctly or that the communication with the one or more further locomotives belonging to the train 100 is not considered to be established and functioning by the transceiver means 230,
  the safety unit 501 considers the global transmission channel, from the master locomotive 101 to the local communication channel 235 inclusive, to be malfunctioning, and therefore the safety unit 501 considers the brake control unit 211 to be unable to receive messages from the master locomotive 101, including messages containing the emergency braking application request.

In a further embodiment, the control system for a railway convoy 400 for the transport of goods may further comprise a first pressure sensor means 236 arranged to be pneumatically connected to the pilot chamber 213 of the relay valve 212. The brake control unit, the first pneumatic solenoid valve 204, the second pneumatic solenoid valve 205, the relay valve 212 and the first pressure sensor means 236 are arranged to perform a function for controlling the pressure in the brake pipe 105 of the railway convoy 400.

The control function may be implemented according to known control algorithms based on the presence of a brake control unit, the first pneumatic solenoid valve 204, the second pneumatic solenoid valve 205, the relay valve 212 and the first pressure sensor means 236.

In this case, the at least one malfunction condition of the control system for a railway convoy 400 may comprise a condition in which at least one of the first electro-pneumatic valve 204, the second pneumatic solenoid valve 205, the valve relay 212 and the first pressure sensor means 236 is not functioning correctly. In other words, the safety unit 501 may also be arranged to prevent the relay valve 212 from supplying the pneumatic brake pipe 105 when the safety unit detects that the pressure control function in the brake pipe 105 of said railway convoy 400 is not functioning correctly.

In a second embodiment, the safety unit 501 may be arranged to receive a diagnostic signal 503 generated by the brake control unit 211. This diagnostic signal 503 may be arranged to have a first state in which it indicates that the brake control unit 211 is functioning correctly and is able to correctly control the pressure 214 at the outlet of the relay valve 212. The diagnostic signal 503 may also be arranged to have a second state which indicates that the brake control unit 211 is not functioning correctly or is unable to correctly control the pressure 214 at the outlet of the relay valve 212.

In fact, the diagnostic signal 503 may also be indicative of the state of health of the pneumatic solenoid valves 204, 205, the first pressure sensor means 236 and the relay valve 212. Further pressure sensors (not shown in the drawings) that are connected to the brake control unit 211, such as, by way of non-exclusive example, a further pressure sensor means connected directly to the brake pipe 105, may provide further information to said brake control unit 211 about the functionality of the elements for controlling the pressure in the brake pipe 105.

In a further embodiment, the control system for a railway convoy may comprise a second pressure sensor means 506 pneumatically connected to the brake pipe 105 and electrically connected to the safety unit 501 by means of an electrical signal 507.

In each embodiment, the first pressure sensor means 236 and the second pressure sensor means 506 may each be a pressure sensor.

In this case, the safety unit 501 may be arranged for:
  monitoring the pressure in the brake pipe 105 by means of the second pressure sensor means 506;
  receiving, via the communication means 235 and simultaneously at the brake control unit 211, the traction and/or braking commands sent by the master locomotive 101 to the at least one slave locomotive, which commands are indicative of pressure values to be applied to the brake pipe 105;
  comparing, for each traction and/or braking command received, that the pressure value indicated by the respective traction and/or braking command falls within a range of values, said threshold range, that includes the respective pressure value measured through said second pressure sensor means 506.

The at least one malfunction condition of the control system for a railway convoy may therefore comprise a condition in which the pressure value indicated by the respective traction and/or braking command does not fall within the threshold range that includes the respective pressure value measured through said second pressure sensor means 506.

In other words, if the pressure value read by the second pressure sensor means 506 coincides, within a predetermined tolerance value, with the pressure value received in the message sent by the master locomotive 101, the safety unit considers the brake control unit 211 and the pneumatic chain composed of the solenoid valves 204, 205, the relay valve 212 and the first pressure sensor 236 to be functioning correctly.

If the pressure value read by the second pressure sensor means 506 falls outside a predetermined tolerance value with respect to the pressure value received in the message sent by the master locomotive 101, the safety unit considers the brake control unit 211 and the pneumatic chain composed of the solenoid valves 204, 205, the relay valve 212 and the first pressure sensor means 236 to not be functioning correctly.

In a further embodiment, the safety unit 501 may be arranged for:
- monitoring the pressure in the brake pipe 105 by means of the second pressure sensor means 506;
- receiving, via the communication means 235 and simultaneously at the brake control unit 211, the traction and/or braking commands sent by the master locomotive 101 to the at least one slave locomotive, which commands are indicative of pressure values to be applied to the brake pipe 105;
- comparing, for each traction and/or braking command received, that the value measured through said second pressure sensor means 506 falls within a threshold range that includes the respective pressure value indicated by the respective traction and/or braking command sent by the master locomotive 101 to the at least one slave locomotive.

The at least one malfunction condition of the control system for a railway convoy may therefore comprise a condition in which the value measured by the second pressure sensor means 506 does not fall within the threshold range including the respective pressure value indicated by the respective traction and/or braking command sent by the master locomotive 101 to the at least one slave locomotive.

To summarize the above, in the presence of at least one of the following cases:
- the diagnostic signal 503 assumes the second state indicating that the brake control unit 211 is not functioning correctly or is unable to correctly control the pressure at the outlet 214 of the relay valve 212,
- the current pressure value present at the brake pipe 105 is outside a predetermined tolerance value with respect to the current pressure value received in the message sent by the master locomotive 101, or vice versa, the safety unit 501 considers the brake control unit 211, the pneumatic solenoid valves 204, 205, the relay valve 212 and the first pressure sensor means 236 to be malfunctioning, i.e. not able to correctly control the pressure at outlet 214 of the relay valve 212, in particular during an emergency braking request.

In a further embodiment, the safety unit 501 may be arranged to prevent the relay valve 212 from supplying the brake pipe 105 by means of a pneumatic solenoid valve 209 placed between the main pipe 201 and the pneumatic inlet of said relay valve 212. The pneumatic solenoid valve 209 may be arranged to assume a first state in which it inhibits the propagation of the pneumatic supply pressure from the main pipe 201 to the pneumatic inlet of said relay valve 212, and to assume a second state in which it allows the propagation of the pneumatic supply pressure from the main pipe 201 to the pneumatic inlet of said relay valve 212. The safety unit 501 may therefore be arranged to drive the pneumatic solenoid valve 209 in its first state when it must prevent the relay valve 212 from supplying the brake pipe 105.

In other words, the safety unit 501 may be arranged to actuate the open or closed state of the pneumatic solenoid valve 203 by means of the electrical command signal 206. By actuating the pneumatic solenoid valve 203 in the open condition, the safety unit 501 allows the pneumatic solenoid valve 204 to be able to increase the pressure in the pilot chamber 213, i.e. it allows the relay valve 212 to increase the pressure in the brake pipe 105. By actuating the pneumatic solenoid valve 203 in the closed condition, the safety unit 501 prevents the pneumatic solenoid valve 204 from being able to increase the pressure in the pilot chamber 213, i.e. it prevents the relay valve 212 from increasing the pressure in the brake pipe 105. Said safety unit 501 is arranged to actuate the open or closed state of the pneumatic solenoid valve 209 by means of the electrical command signal 210. By actuating the pneumatic solenoid valve 209 in the open condition, the safety unit 501 allows the inflow of air from the main pipe 201 to the relay valve 212, thereby allowing the relay valve 212 to increase the pressure in the brake pipe 105. By actuating the pneumatic solenoid valve 209 in the closed condition, the safety unit 501 prevents the inflow of air from the main pipe 201 to the relay valve 212, thereby preventing the relay valve 212 from increasing the pressure in the brake pipe 105. The safety unit 501 is arranged to control the open or closed state of the pneumatic solenoid valve 215 by means of the electrical command signal 218. By actuating the pneumatic solenoid valve 215 in the open condition, the safety unit 501 allows the relay valve 212 to function properly in controlling the pressure in the brake pipe 105. By actuating the pneumatic solenoid valve 215 in the closed condition, the safety unit 501 isolates the relay valve 212, i.e. it prevents the relay valve 212 from increasing or decreasing the pressure in the brake pipe 105.

Figure 6:
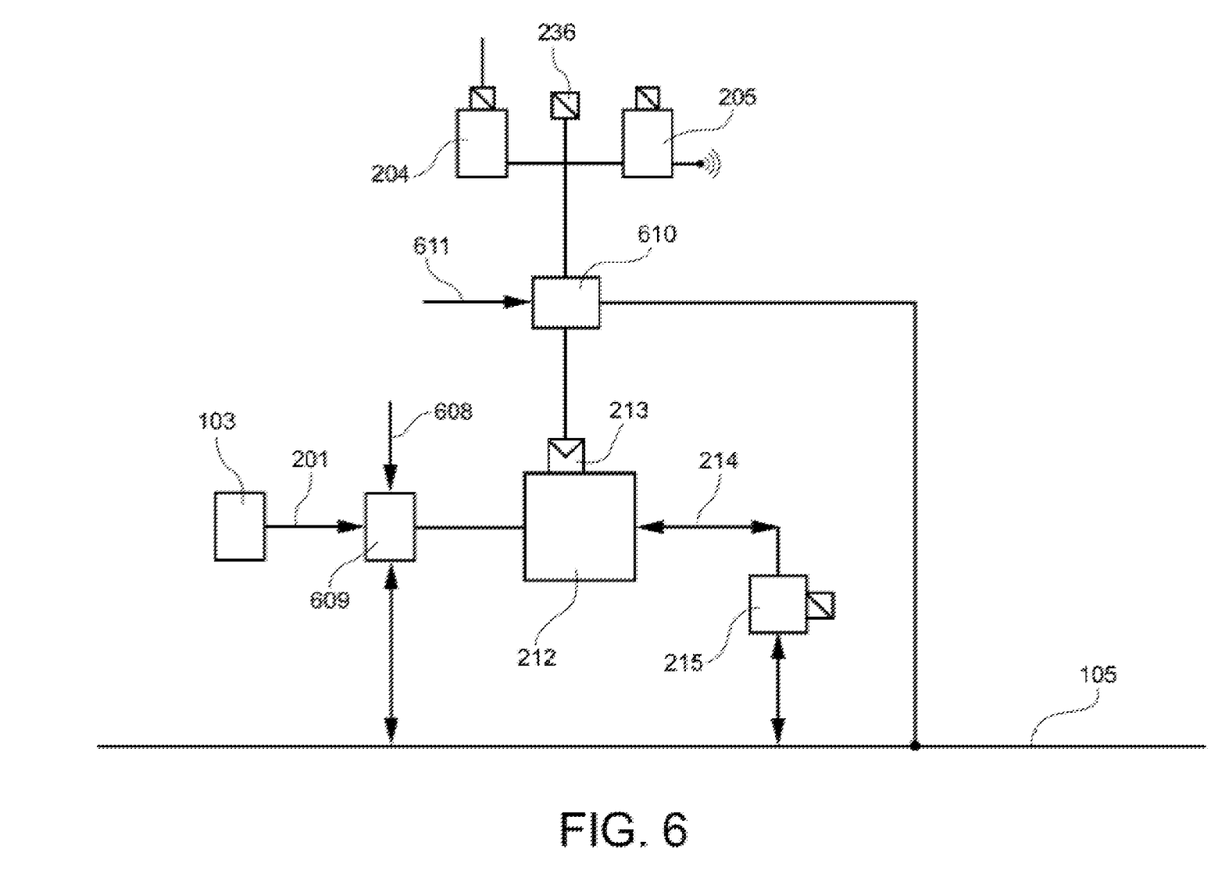
FIG. 6 shows possible solutions for inhibiting a relay valve from producing pressure variations on a brake pipe.

FIG. 6 illustrates further solutions for being able to inhibit the relay valve 212 from producing pressure variations on the brake pipe 105.

The safety unit 501 may preferably be arranged to prevent the relay valve 212 from supplying the brake pipe 105 by means of a first electro-pneumatic module 609. The first electro-pneumatic module 609 may include a first pneumatic inlet connected to the main pipe 201, a second pneumatic inlet connected to the brake pipe 105 and a pneumatic outlet connected to the inlet of said relay valve 212. The first electro-pneumatic module may be arranged for:
- assuming a first state in which it pneumatically connects the main pipe 201 to the inlet of the relay valve 212;
- assuming a second state in which it pneumatically connects the brake pipe 105 to the inlet of the relay valve 212.

In this case, the safety unit 501 may be arranged to drive the first electro-pneumatic module 609 in its second state when it must prevent the relay valve 212 from supplying and discharging the brake pipe 105.

In one realization example, the safety unit 501 may be arranged to control the state of the first electro-pneumatic module 609 by means of the electrical command signal 608. In a first state, the electro-pneumatic module 609 may pneumatically connect the inlet of the relay valve 212 to the main pipe 201, thereby allowing the relay valve 212 to increase the pressure at its outlet 214, i.e. at the brake pipe 105. In a second state, the first electro-pneumatic module 609 may pneumatically connect the inlet of the relay valve 212 to the brake pipe 105, making the supply inlet coincide with the outlet of the relay valve 212, thereby preventing the relay valve 212 from producing pressure variations at its outlet 214, i.e. at the brake pipe 105.

Preferably, in addition or as an alternative to the first electro-pneumatic module 609, the safety unit 501 may be arranged to prevent the relay valve 212 from supplying and discharging the brake pipe 105 by means of a second electro-pneumatic module 610. The second electro-pneumatic module 610 may include a first pneumatic inlet connected downstream of the first pneumatic solenoid valve 204 arranged to increase the pressure in the pilot chamber 213 of said relay valve 212 and downstream of the second pneumatic solenoid valve 205 arranged to reduce the pressure in the pilot chamber 213 of said relay valve 212, a second pneumatic inlet connected to the brake pipe 105, and a pneumatic outlet connected to the pilot chamber 213 of said relay valve 212. The second electro-pneumatic module may be arranged for:

assuming a first state in which it pneumatically connects the first pneumatic solenoid valve 204 arranged to increase the pressure in the pilot chamber 213 of said relay valve 212 and the second pneumatic solenoid valve 205 arranged to reduce the pressure in the pilot chamber 213 of said relay valve 212 to said pilot chamber 213 of said relay valve 212;

assuming a second state in which it pneumatically connects the brake pipe 105 to the pilot chamber 213 of said relay valve 212.

In this case, the safety unit 501 may be arranged to drive said second electro-pneumatic module 610 in its second state when it must prevent the relay valve 212 from supplying and discharging the brake pipe 105.

In one realization example, the safety unit 501 may be arranged to control the state of the second electro-pneumatic module 610 by means of an electrical command signal 611. In a first state, the second electro-pneumatic module 610 may pneumatically connect the pilot chamber 213 to the pneumatic solenoid valves 204, 205 and to the first pressure sensor means 236, thereby allowing the brake control unit 211 to regularly control the pressure at the outlet 214 of the relay valve 212, i.e. at the brake pipe 105. In a second state, the second electro-pneumatic module 610 pneumatically connects the pilot chamber 213 to the brake pipe 105, making the control inlet coincide with the outlet of the relay valve 212, thereby preventing the relay valve 212 from producing pressure variations at its outlet 214, i.e. at the brake pipe 105.

In a further aspect, the safety unit 501 may be arranged to generate a command signal 508 for actuating the contact 505. By actuating said contact 505 in a closed position, the safety unit 501 allows the traction control unit 232 to operate according to the state assumed by the electrical control signal 233, or by the pressure switch 231, as described above. By actuating said contact 505 in an open position, the safety unit 501 brings the electrical control signal into the condition in which it inhibits traction torque being applied to the traction control unit 501.

The safety unit 501 may be arranged to generate a command signal 509 for controlling the contact 504. By actuating said contact 504 in the open position, the safety unit 501 interrupts the emergency loop 220 by bringing the pneumatic emergency solenoid valve 219 into the state in which it connects the brake pipe 105 to the atmosphere, thereby reducing the pneumatic pressure in the brake pipe 105 to 0 bar.

Furthermore, interrupting the emergency loop 220 opens the contacts 223 by de-powering the pneumatic solenoid valves 204, 205, thereby forcing the relay valve 212 to reduce the pneumatic pressure in the brake pipe 105 to 0 bar, in an action parallel to the emergency valve 219.

In yet a further embodiment, the safety unit 501 may be arranged to be able to prevent the relay valve 212 from supplying and discharging the brake pipe 105 by means of a pneumatic solenoid valve 215 located between the outlet 214 of the relay valve 212 and the brake pipe 105. The pneumatic solenoid valve 215 may be arranged to have a first state in which it inhibits the pneumatic connection between the outlet 214 of the relay valve 212 and the brake pipe 105. The pneumatic solenoid valve is arranged to have a second state in which it allows the connection between the outlet 214 of the relay valve 212 and the brake pipe 105. The safety unit 501 may drive the pneumatic solenoid valve 215 in its first state in order to be able to prevent the relay valve 212 from supplying and discharging the brake pipe 105.

Moreover, in a further embodiment, the safety unit 501 may be arranged to control a pneumatic emergency solenoid valve 219 pneumatically connected to the brake pipe 105. The pneumatic emergency solenoid valve 219 may be arranged to assume a first state in which it inhibits the pneumatic connection between the brake pipe 105 and the atmosphere, and to assume a second state in which it allows the pneumatic connection between the brake pipe 105 and the atmosphere. The safety unit 501 may be arranged to actuate said pneumatic emergency solenoid valve 219 in its second state in the presence of a request for application of emergency braking from the master locomotive 101.

In yet a further embodiment, the safety unit 501 may be arranged to control a pneumatic emergency solenoid valve 219 pneumatically connected to the brake pipe 105. The pneumatic emergency solenoid valve 219 may be arranged to assume a first state in which it inhibits the pneumatic connection between the brake pipe 105 and the atmosphere, and to assume a second state in which it allows the pneumatic connection between the brake pipe 105 and the atmosphere. The safety unit 501 may be arranged to actuate the pneumatic emergency solenoid valve 219 in its second state when the communication channel 404, 405 and the communication means 235, i.e. the global communication channel 404, 405, 230, 235, are not functioning correctly and/or in the presence of a pressure variation in the brake pipe 105, which variation indicates emergency braking in progress.

In light of the embodiments and examples described above, in at least one of the following cases:

the safety unit 501 considers the global transmission channel, from the master locomotive 101 to the local communication channel 235 inclusive, to be malfunctioning, the safety unit 501 considers the brake control unit 211 to be unable to correctly control the pressure at the outlet 214 of the relay valve 212, in particular during an emergency braking request, said safety unit 501 may prevent the relay valve from increasing the pressure in the brake pipe 105 by performing at least one of the following actions:

actuating the pneumatic solenoid valve 209 in the first state in which said pneumatic solenoid valve 209 inhibits the propagation of the supply pressure from the main pipe 201 to the relay valve 212, actuating the pneumatic solenoid valve 215 in the first state in which said pneumatic solenoid valve 215 inhibits the pneumatic connection between the brake pipe 105 and the relay valve 212, actuating the first electro-pneumatic module 609 in its second state in which said first electro-pneumatic module 609 pneumatically connects the inlet of the relay valve 212 to the brake pipe 105, making the supply inlet coincide with the outlet of the relay valve 212, actuating the second electro-pneumatic module 610 in its second state in which said second electro-pneumatic module 610 pneumatically connects the pilot chamber 213 to the brake pipe 105, making the control inlet coincide with the outlet of the relay valve 212.

The solution described above advantageously prevents the one or more slave locomotives 402, 403 from hindering the master locomotive 101 from applying braking, particularly emergency braking along the railway convoy 400 if, for at least one of the reasons listed above, the brake control unit 211 associated with said one or more slave locomotives is unable to replicate the braking command, particularly emergency braking.

In the presence of an emergency braking request issued by the master locomotive 101 and received by the safety unit 501 at the same time as the brake control unit 211, said safety unit opens the contact 504, de-energizing the emergency valve 219 and making it assume its second state in which it allows the pneumatic connection between the brake pipe 105 and the atmosphere, thereby applying emergency braking. Furthermore, opening the contact 504 results in the de-energization of the pneumatic solenoid valves 204, 205, with consequent discharge of the brake pipe 105 by the relay valve 212.

If globally the communication channel is not able to transmit the emergency braking request from the master locomotive 101 to the brake control unit 211 or safety unit 501 associated with the at least one slave locomotive 402, 403, the safety unit 501 is able to identify that the application of emergency braking is in progress by observing the behavior of the pressure variations in the brake pipe 105 by means of the second pressure sensor means 506 and using suitable algorithms described in WO2017025895.

When emergency braking is in progress, the safety unit 501 may for example open the contact 504 by means of the signal 509, thereby locally replicating emergency braking according to the procedure described above, or according to the procedure described in WO2017025895.

This solution advantageously accelerates the application of emergency braking by contributing to the rapid reduction of the pressure in the brake pipe 105, even when the communication channel is unable to transmit the emergency braking request to the brake control unit 211, or when the brake control unit 211 is unable to reduce the pressure in the brake pipe 105 by means of the relay 212.

When emergency braking is in progress, the safety unit 501 may for example open the contact 505 by means of the signal 508, thereby preventing the traction control unit 232 from powering the traction motors.

This solution advantageously accelerates the inhibition of the traction unit 232 in advance of the pressure switch 231 intervening (which would intervene only when the pressure in the brake pipe has dropped below 3.5 bar), thereby reducing the longitudinal stresses on the railway convoy 400.

By comparison with WO2017025895, this invention offers the advantage of separating the functions of normal braking operation, communication with the TCMS (train control monitoring system) and interfacing with the driver, which functions are carried out, according to the prior art, by the brake control unit 211, from the functions of monitoring and guaranteeing emergency braking, which are assigned to the safety unit 501. Separating the functions makes it possible to maintain the development of the brake control unit 211 at a safety level SIL≤2, and to localize developing the appropriate safety level SIL≥2 on the safety unit 501, thereby reducing the impact of cost of development.

A further advantage of this invention is that it is possible to update the technology of existing locomotives for distributed traction functionality, as illustrated in FIG. 4.

It is in fact sufficient to add a safety unit 501 and an appropriate transceiver means 230 to the braking system present on the current locomotives illustrated in FIG. 2, and to make limited changes to the electrical part of the system, without having to intervene on the pneumatic part as illustrated in many of the previously reported solutions, or without having to re-develop the hardware and software components of the brake control unit 211 at SIL≥3 level.

The safety unit 501 may be developed according to a safety level higher than the safety level of the associated brake control unit 211. For example, the safety unit 501 may be developed according to a safety integrity level SIL≥3.

The safety unit 501 may be made according to an architecture including one or more microprocessors, or according to an architecture including one or more programmable devices, or according to an architecture including one or more programmable devices and one or more microprocessors.

Various aspects and embodiments of a control system for a railway convoy according to the invention have been described. It is understood that each embodiment may be combined with any other embodiment. Furthermore, the invention is not limited to the described embodiments, but may be varied within the scope defined by the appended claims.

The invention claimed is:

1. A control system for a railway convoy for transport of goods, comprising a plurality of wagons, a master locomotive placed at a head of the railway convoy and at least one slave locomotive distributed in the railway convoy;

the railway convoy comprising a brake pipe for service and emergency pneumatic braking of said railway convoy, the brake pipe extending along the entire railway convoy;

wherein:

the master locomotive is arranged to control a pressure in the brake pipe and to send traction and/or braking commands to said at least one slave locomotive by means of a radio technology or wired technology communication channel, the at least one slave locomotive comprises a transceiver means arranged to receive the traction and/or braking commands sent by the master locomotive through the communication channel, said transceiver means being further arranged to re-transmit, by means of a communication means internal to said at least one slave locomotive, the traction and/or braking commands to a traction control unit and to a brake control unit of said at least one slave locomotive in order to control the pressure in the brake pipe;

the brake control unit being arranged to control the pressure in the brake pipe by acting on a first pneumatic solenoid valve arranged to increase the pressure in a pilot chamber of a relay valve and on a second pneumatic solenoid valve arranged to reduce pressure in the pilot chamber of said relay valve;

an inlet of said relay valve being arranged to be supplied by a main pipe and an outlet of said relay valve being arranged to be connected to said brake pipe; and the control system for a railway convoy being characterized in that it includes a safety unit associated with said brake control unit, said safety unit being arranged to prevent the relay valve from supplying the brake pipe when at least one malfunction condition of the control system for a railway convoy occurs, wherein the safety unit is developed according to a safety integrity level higher than the safety integrity level of the associated brake control unit.

2. The control system for the railway convoy according to claim 1, wherein said at least one malfunction condition of the control system for the railway convoy comprises:
   a condition in which the communication channel no longer allows traction and/or braking commands to be sent to said at least one slave locomotive, or,
   a condition in which the transceiver means is no longer able to receive the traction and/or braking commands sent by the master locomotive through said communication channel or to re-transmit the traction and/or braking commands to the traction control unit and to the brake control unit of said at least one slave locomotive in order to control the pressure in the brake pipe, or
   a condition in which the communication means internal to said at least one slave locomotive does not allow said traction and/or braking commands to be retransmitted to the traction control unit and to the brake control unit of said at least one slave locomotive.

3. The control system for the railway convoy according to claim 1, comprising a first pressure sensor means arranged to be pneumatically connected to the pilot chamber of said relay valve;
   wherein all of the brake control unit, the first pneumatic solenoid valve, the second pneumatic solenoid valve, the relay valve and the first pressure sensor means are arranged to perform a function for controlling the pressure in the brake pipe of said railway convoy; and
   wherein said at least one malfunction condition of the control system for a railway convoy comprises:
      a condition in which at least one among the first pneumatic solenoid valve, the second pneumatic solenoid valve, the relay valve and the first pressure sensor means is not functioning correctly.

4. The control system for the railway convoy according to claim 1, comprising a second pressure sensor means pneumatically connected to the brake pipe and electrically connected to the safety unit by means of an electrical signal;
   the safety unit being arranged for:
      monitoring the pressure in the brake pipe by means of said second pressure sensor means;
      receiving, via the communication means and simultaneously at the brake control unit, the traction and/or braking commands sent by the master locomotive to the at least one slave locomotive, which commands are indicative of pressure values to be applied to the brake pipe; and
      comparing, for each traction and/or braking command received, that the pressure value indicated by the respective traction and/or braking command falls within a threshold range including the respective pressure value measured through said second pressure sensor means;
   wherein said at least one malfunction condition of the control system for a railway convoy comprises:
      a condition in which the pressure value indicated by the respective traction and/or braking command does not fall within the threshold range including the respective pressure value measured through said second pressure sensor means.

5. The control system for the railway convoy according to claim 1, comprising a second pressure sensor means pneumatically connected to the brake pipe and electrically connected to the safety unit by means of an electrical signal;
   the safety unit being arranged for:
      monitoring the pressure in the brake pipe by means of said second pressure sensor means;
      receiving, via the communication means and simultaneously at the brake control unit, the traction and/or braking commands sent by the master locomotive to the at least one slave locomotive, which commands are indicative of pressure values to be applied to the brake pipe; and
      comparing, for each traction and/or braking command received, that the pressure value measured through said second pressure sensor means falls within a threshold range including the pressure value indicated by the respective traction and/or braking command;
   wherein said at least one malfunction condition of the control system for a railway convoy comprises:
      a condition in which the pressure value measured through said second pressure sensor means does not fall within the threshold range including the pressure value indicated by the respective traction and/or braking command.

6. The control system for the railway convoy according to claim 1, wherein the safety unit is arranged to prevent the relay valve from supplying the brake pipe by means of a pneumatic solenoid valve placed between the main pipe and a pneumatic inlet of said relay valve;
   wherein the pneumatic solenoid valve is arranged to assume a first state in which it inhibits the propagation of the pneumatic supply pressure from the main pipe to the pneumatic inlet of said relay valve, and to assume a second state in which it allows the propagation of the pneumatic supply pressure from the main pipe to the pneumatic inlet of said relay valve; and
   wherein the safety unit is arranged to drive the pneumatic solenoid valve in its first state when it must prevent the relay valve from supplying the brake pipe.

7. The control system for the railway convoy according to claim 1, wherein the safety unit is arranged to prevent the relay valve from supplying the brake pipe by means of a first electro-pneumatic module;
   wherein said first electro-pneumatic module includes a first pneumatic inlet connected to the main pipe, a second pneumatic inlet connected to the brake pipe and a pneumatic outlet connected to the inlet of said relay valve;
   wherein said first electro-pneumatic module is arranged for:
      assuming a first state in which it pneumatically connects the main pipe to the inlet of the relay valve; and
      assuming a second state in which it pneumatically connects the brake pipe to the inlet of the relay valve;
   wherein said safety unit is arranged to drive said first electro-pneumatic module in its second state when it must prevent the relay valve from supplying and discharging the brake pipe.

8. The control system for the railway convoy according to claim 1, wherein the safety unit is arranged to prevent the relay valve from supplying and discharging the brake pipe by means of a second electro-pneumatic module;
   said second electro-pneumatic module including a first pneumatic inlet connected downstream of the first pneumatic solenoid valve arranged to increase the pressure in the pilot chamber of said relay valve and downstream of the second pneumatic solenoid valve arranged to reduce the pressure in the pilot chamber of said relay valve, a second pneumatic inlet connected to the brake pipe, and a pneumatic outlet connected to the pilot chamber of said relay valve; and wherein said second electro-pneumatic module is arranged for:
- assuming a first state in which it pneumatically connects the first pneumatic solenoid valve arranged to increase the pressure in the pilot chamber of said relay valve and the second pneumatic solenoid valve arranged to reduce the pressure in the pilot chamber of said relay valve to said pilot chamber of said relay valve; and
- assuming a second state in which it pneumatically connects the brake pipe to the pilot chamber of said relay valve;

said safety unit being arranged to drive said second electro-pneumatic module in its second state when it must prevent the relay valve from supplying and discharging the brake pipe.

9. The control system for the railway convoy according to claim 1, wherein the safety unit is arranged to control a pneumatic emergency solenoid valve pneumatically connected to the brake pipe;

wherein said pneumatic emergency solenoid valve is arranged for:
- assuming a first state in which it inhibits the pneumatic connection between the brake pipe and an atmosphere;
- assuming a second state in which it allows the pneumatic connection between the brake pipe and the atmosphere;

said safety unit being arranged for:
- actuating said pneumatic emergency solenoid valve in its second state in the presence of a request for application of emergency braking from the master locomotive; and/or
- actuating said pneumatic emergency solenoid valve in its second state in the presence of a pressure variation in the brake pipe, which variation indicates emergency braking in progress, and/or when at least one among the transceiver means, the communication channel and the communication means is not functioning correctly.

10. The control system for the railway convoy according to claim 9, wherein the safety unit is arranged to prevent the relay valve from supplying and discharging the brake pipe by means of a pneumatic solenoid valve arranged to be positioned between an outlet of said relay valve and the brake pipe;

wherein the pneumatic solenoid valve is arranged for:
- assuming a first state in which it inhibits the pneumatic connection between the outlet of the relay valve and the brake pipe; and
- assuming a second state in which it allows the pneumatic connection between the outlet of the relay valve and the brake pipe;

wherein the safety unit is arranged to drive the pneumatic solenoid valve in its first state when it must prevent the relay valve from supplying and discharging the brake pipe.

11. The control system for the railway convoy according to claim 1, wherein the safety unit is developed further according to a safety integrity level SIL≥3.

12. The control system for the railway convoy according to claim 1, wherein the safety unit is made according to an architecture including one or more microprocessors.

13. The control system for the railway convoy according to claim 1, wherein the safety unit is made according to an architecture including one or more programmable devices.

* * * * *